US010070010B2

United States Patent
Hatayama et al.

(10) Patent No.: US 10,070,010 B2
(45) Date of Patent: Sep. 4, 2018

(54) SHADE CORRECTING IMAGE READING BY BIASING FORCE OF A COLOR REFERENCE BODY IN THE DOCUMENT WIDTH DIRECTION

(71) Applicants: Koji Hatayama, Kanagawa (JP);
Tatsuaki Nagano, Kanagawa (JP);
Takayuki Andoh, Kanagawa (JP);
Kaoru Tada, Kanagawa (JP);
Munekazu Hirata, Kanagawa (JP);
Yasunobu Youda, Kanagawa (JP)

(72) Inventors: Koji Hatayama, Kanagawa (JP);
Tatsuaki Nagano, Kanagawa (JP);
Takayuki Andoh, Kanagawa (JP);
Kaoru Tada, Kanagawa (JP);
Munekazu Hirata, Kanagawa (JP);
Yasunobu Youda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/378,676

(22) Filed: Dec. 14, 2016

(65) Prior Publication Data
US 2017/0180603 A1 Jun. 22, 2017

(30) Foreign Application Priority Data
Dec. 17, 2015 (JP) .................... 2015-246058

(51) Int. Cl.
*H04N 1/407* (2006.01)
*H04N 1/12* (2006.01)
*H04N 1/00* (2006.01)

(52) U.S. Cl.
CPC ....... *H04N 1/4076* (2013.01); *H04N 1/00588* (2013.01); *H04N 1/125* (2013.01);
(Continued)

(58) Field of Classification Search
CPC .... H04N 1/4076; H04N 1/4078; H04N 1/125; H04N 1/1225; H04N 1/00588; H04N 2201/0081; H04N 2201/0094
See application file for complete search history.

(56) References Cited

U.S. PATENT DOCUMENTS

2015/0341515 A1  11/2015  Youda et al.
2016/0127590 A1   5/2016  Hatayama et al.
(Continued)

FOREIGN PATENT DOCUMENTS

JP    2007-258964    10/2007
JP    2010-199792     9/2010

OTHER PUBLICATIONS

U.S. Appl. No. 15/187,822, filed Jun. 21, 2016.

*Primary Examiner* — Christopher D Wait
(74) *Attorney, Agent, or Firm* — Harness, Dickey & Pierce, P.L.C.

(57) ABSTRACT

An image reading device, which may be incorporated in an image forming apparatus, includes an image reader, a color reference body, a biasing body, a reading gap forming device, and a driving device. The image reader reads an image of an original document. The color reference body has a white reference face to position facing the image reader within a predetermined range in a document width direction. The biasing body biases the color reference body to the image reader. The reading gap forming device forms a reading gap while receiving a biasing force from the biasing body on the outside of the predetermined range. The driving device has a force drive transmission body engaged with a center of the color reference body in the document width direction and drives the color reference body in the document width direction at the center via the force drive transmission body.

8 Claims, 3 Drawing Sheets

(52) U.S. Cl.
CPC ... *H04N 1/1225* (2013.01); *H04N 2201/0081* (2013.01); *H04N 2201/0094* (2013.01)

(56) References Cited

U.S. PATENT DOCUMENTS

| | | |
|---|---|---|
| 2016/0277624 A1 | 9/2016 | Osanai et al. |
| 2016/0360073 A1* | 12/2016 | Hatayama ............ H04N 1/6075 |
| 2017/0142288 A1* | 5/2017 | Yoshita .............. H04N 1/00891 |

* cited by examiner

SHADE CORRECTING IMAGE READING BY BIASING FORCE OF A COLOR REFERENCE BODY IN THE DOCUMENT WIDTH DIRECTION

CROSS-REFERENCE TO RELATED APPLICATION

This patent application is based on and claims priority pursuant to 35 U.S.C. § 119(a) to Japanese Patent Application No. 2015-246058, filed on Dec. 17, 2015, in the Japan Patent Office, the entire disclosure of which is hereby incorporated by reference herein.

BACKGROUND

Technical Field

This disclosure relates to an image reading device that reads a document being conveyed to an image reading position, and an image forming apparatus incorporating the image reading device.

Related Art

Various automatic document feeders employed in a copier or other image forming apparatuses include a sheet-through image reading device to automatically convey an original document along a sheet conveying passage through a reading position. In such an image reading device, in order to reduce inconveniences such as variation in brightness or image color caused by uneven light, and uneven sensitivity of an image sensor, shading correction is performed based on image data read from a white reference face.

For example, a known image reading device includes a reading unit having a line image sensor and a moving mechanism for the line image sensor, and a drive driving the moving mechanism from outside the reading unit. The line image sensor moves the line image sensor between a position for reading a conveyed document, and a position for reading a white reference face used for shading correction, and the image reading device.

The known image reading device prevents deterioration in brightness of the white reference face due to scratches or stains to prevent shading data from having an abnormal value at the scratches or stains.

SUMMARY

At least one aspect of this disclosure provides an image reading device including an image reader, a color reference body, a biasing body, a reading gap forming device, and a driving device. The image reader is configured to read an image formed on a surface of an original document. The color reference body is movable and has a white reference face used for shading correction in the image reader. The color reference body is configured to position the white reference face at a position facing the image reader within a predetermined range in a document width direction orthogonal to a conveyance direction of the document. The biasing body is configured to bias the color reference body to the image reader. The reading gap forming device is interposed between the image reader and the color reference body and configured to form a reading gap for reading the image between the image reader and the color reference body, while receiving a biasing force from the biasing body, on the outside of the predetermined range. The driving device is configured to drive the color reference body to move the color reference body in the document width direction, relative to the image reader. The driving device has a force drive transmission body engaged with a center of the color reference body in the document width direction and driving the color reference body in the document width direction at the center via the force drive transmission body.

Further, at least one aspect of this disclosure provides an image forming apparatus including the above-described image reading device and an image forming device configured to form an image read by the image reading device on a recording medium.

DETAILED DESCRIPTION

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

A description is given of a configuration of an image reading device 5 for reading an image formed on an original document, according to an embodiment of this disclosure, with reference to FIGS. 1 through 5.

It is to be noted that identical parts are given identical reference numerals and redundant descriptions are summarized or omitted accordingly.

It is to be noted in the following embodiments that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Figure 1:
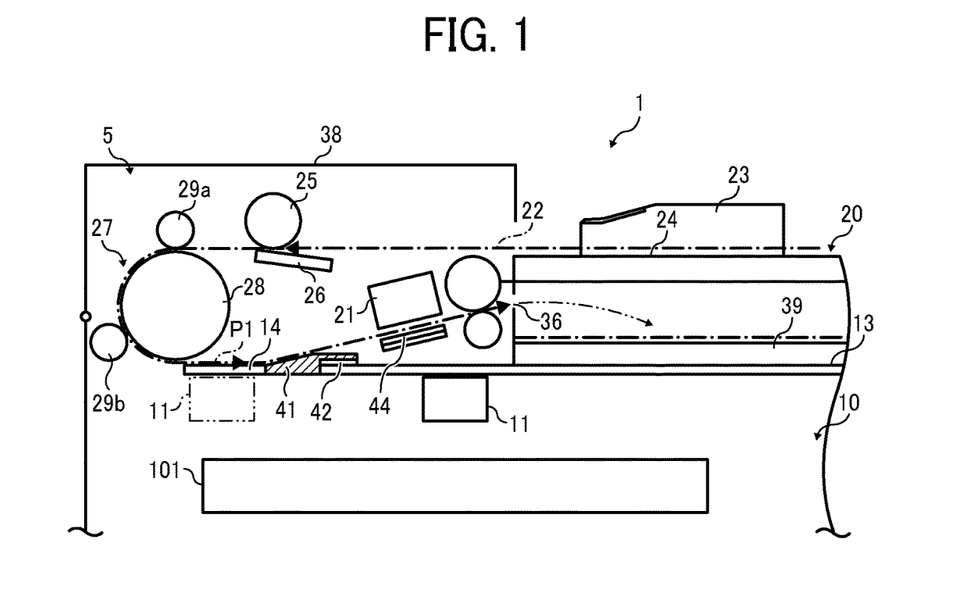
FIG. 1 is a diagram of a schematic configuration of a main portion of an image forming apparatus including an image reading device according to an embodiment of this disclosure.

FIG. 1 is a schematic diagram illustrating an entire configuration of the image reading device 5 incorporated in a digital multifunctional printer 1 according to an embodiment of this disclosure.

In the present embodiment, the image reading device 5 is configured as an automatic document feeder, and is applied to an image forming apparatus employing an arbitrary method such as an electrophotographic method or inkjet recording method, for example, to a document image reader of a digital multifunction printer 1 illustrated in FIG. 1.

The digital multifunction printer 1 illustrated in FIG. 1 has the functions of a copier, a printer, a facsimile machine, a scanner, and the like. The digital malfunction printer 1 can output a full color image or a monochrome image in a recording medium (a recording sheet), or in a predetermined data format, on the basis of input data such as read image data. However, the image reading device according to an embodiment of this disclosure preferably has an image reading function for a conveyed document, and may not have an image recording and outputting function.

Figure 2:
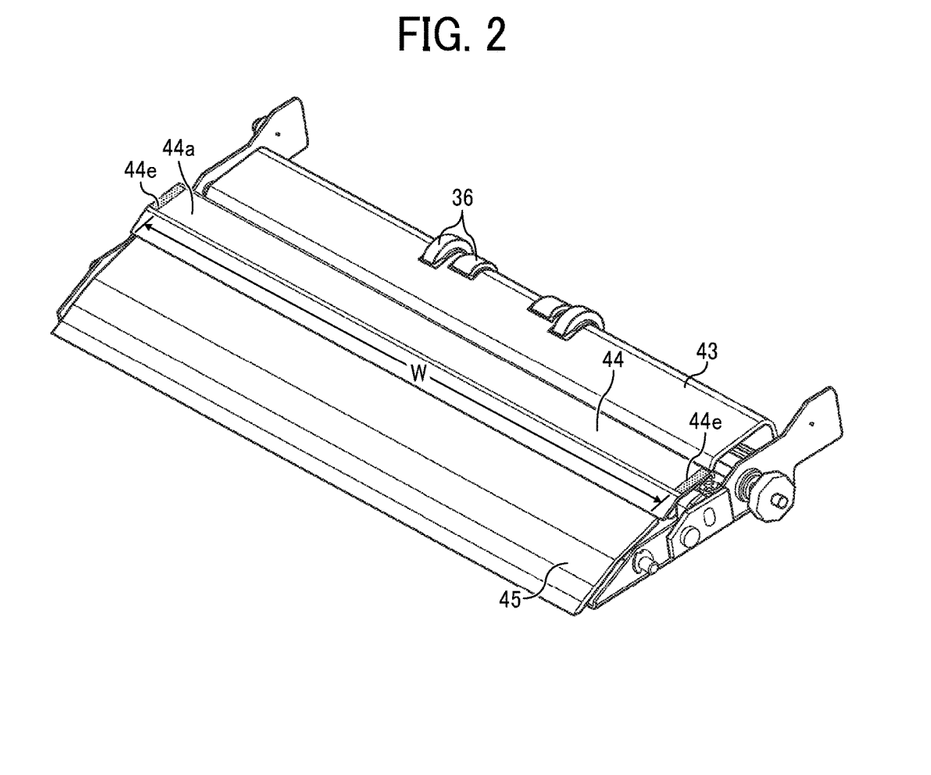
FIG. 2 is a perspective view illustrating a surface configuration of a document guide of a color reference body in the image reading device according to an embodiment of this disclosure.

As illustrated in FIGS. 1 and 2, the digital multifunction printer 1 includes an apparatus body 10 and an automatic document feeder 20. Hereinafter, referred to as an ADF 20. The apparatus body 10 includes a sheet feeding device and an image forming device 101. The ADF 20 includes a second image reader 21 disposed above the apparatus body 10, and a first image reader 11. In addition, the first image reader 11 and the second image reader 21 are included in the image reading device 5, as a whole.

The sheet feeding device of the apparatus body 10 has, for example, a plurality of stages of paper feeding containers, each accommodating cut recording sheets, and a plurality of sets of paper feeding rollers picking up a recording sheet from any of the paper feeding containers and feeding the sheet. Furthermore, the image forming device 101 includes, for example, an exposure device, a plurality of photoconductor drums, a developing device using four color toners of cyan (C), magenta (M), yellow (Y), and black (K), a transfer belt, a secondary transfer device, and a fixing device. The image forming device 101 forms an output image, such as an image file or data, externally output on the basis of an image read by any of the first and second image readers 11 and 21.

The image reading device 5 is switched between a flatbed scanner mode (mounted-document reading mode), and a DF scanner mode (conveyed-document reading mode).

The flatbed scanner mode is an operation mode performed upon performance of a read starting request operation made by pressing a copy start button or the like, while a document is mounted on a flatbed contact glass 13 at the upper part of the apparatus body 10 to read an image of the mounted document. Furthermore, the DF scanner mode is an operation mode reading an image of a conveyed document, at an image reading position P1 adjacent to the image reader 11, during automatic conveyance of the document by the ADF 20.

The image reader 11 irradiates an image surface of the document on the flatbed contact glass 13 with light, in the flatbed scanner mode. Then, the image reader 11 converts light reflected from the image surface of the document to an image signal to read the image of the document.

The ADF 20 separates original document sheets one by one from a document sheet bundle mounted on a document mounting tray 24 (document mounting stage), feeds the document sheets into a document conveying passage 22, and conveys the document sheets along the document conveying passage 22, in the DF scanner mode. During the conveyance, the document sheets sequentially partially face an upper surface of a document feeder contact glass (hereinafter referred to as DF contact glass) 14, from an upstream side in a conveyance direction.

The DF scanner mode is selected, for example, when setting of the original document on the document mounting tray 24 is detected. Then, when the DF scanner mode is selected, the image reader 11 is moved under the DF contact glass 14, and repeatedly performs line scanning of a front image of the original document passing through the image reading position P1 previously defined on the DF contact glass 14 to read the front image.

The document mounting tray 24 has right and left movable side guide plates 23 mounted to position the document sheets set in the ADF 20 in a sheet width direction orthogonal to a sheet feeding direction in which the original document sheets are fed. These side guide plates 23 approaches and separates relative to each other to align the centers of the document mounting tray 24 and the document sheet in the width direction.

The ADF 20 is covered with a cover 38 opening and closing at least an upper side of the ADF 20. The cover 38 covers over an end of the document mounting tray 24 on a paper feeding side so that a front end of the document sheet is under the cover 38. Furthermore, a main portion of a guide forming the document conveying passage 22 of the ADF 20 includes a rib formed on the cover 38.

In contrast, the ADF 20 includes a feed roller 25 and a separating plate 26 that feed an uppermost sheet of the original documents set on the document mounting tray 24, in the sheet feeding direction, while frictionally separating the upper most sheet. Furthermore, the ADF 20 includes a conveyor 27 (that is a document conveying device) feeding the original document fed into the document conveying passage 22 by the feed roller 25, onto the DF contact glass 14 to have an attitude from which the image is read, and feed the document to a document exit 36, after reading the image.

The conveyor 27 reverses the original document sheet separated and fed by the feed roller 25 so that the original document sheet is turned along the document conveying passage 22, and conveys the original document sheet so that the original document sheet passes through the document sheet previously defined on an upper surface of the DF contact glass 14. For such document conveyance, a plurality of conveying rollers 28, 29a, and 29b, and a registration sensor detecting the front end of the document sheet in the conveyance direction are provided on an upstream side from the DF contact glass 14 in the document conveying passage 22.

The document separated by the feed roller 25 is conveyed to pass the DF contact glass 14 by the conveying rollers 28, 29a, and 29b, and the front image of the document is appropriately read by the image reader 11, based on timing detecting a front end of the original document by the registration sensor.

For example, when the front end of the original document is detected by the registration sensor, time at which a position of the front end of the original document detected by counting pulses of a sheet feed motor as a driving source reaches the reading position on the DF contact glass 14 is appropriately specified. Then, a gate signal representing an effective image area on a surface of the document in a sub-scanning direction is started to be transmitted from a controller of the ADF to a controller of the device body, and the gate signal is continuously transmitted until a rear end position of the original document passes through the reading position.

When reading a rear image of the document is requested, the rear image is read by the second image reader 21 including a contact image sensor for reading the back side.

The second image reader 21 includes a light source irradiating the original document with light, for example, on the basis of a lighting signal from the controller of the apparatus body 10, a plurality of sensor chips receiving light reflected from the document, and a plurality of amplifiers each amplifying a signal output from each of the sensor chips. The second image reader 21 further includes an A/D converter converting the signal amplified by the amplifier from an analog signal to a digital signal, and an image processor performing image processing on the digital converted signal. Furthermore, the second image reader 21 has, for example, an output control circuit performing output control of a signal stored in a frame memory on the basis of a timing signal from the controller, and an interface circuit outputting the signal from the output control circuit toward the apparatus body 10. It is to be noted that, to the second image reader 21, the power is supplied from the controller of the ADF 20.

Timing of reading the rear image by the second image reader 21 is also controlled in a substantially similar manner to the timing of reading the front image, and the document is ejected into a document ejection tray 39 after reading.

Reading exit rollers 31 and 32 conveying the document from which the front image has been read, toward the second image reader 21 are provided, on a downstream side from the DF contact glass 14 in the document conveying passage 22. In addition, a back side white reference plate 44 facing the second image reader 21, and document ejection rollers 37a and 37b positioned on a downstream side from the second image reader 21 and the back side white reference plate 44 are provided on a downstream side from the reading exit rollers 31 and 32. It is to be noted that the number or location of groups of these rollers to be disposed for conveyance and document ejection is arbitrarily set according to a path setting condition of the document conveying passage 22 or a length or the like of an original document of minimum size in the conveyance direction.

The back side white reference plate 44 is formed as a color reference body disposed opposite to the second image reader 21 in the whole main scanning direction, and has a white reference face 44a used for shading correction, on an upper surface positioned opposite to the second image reader 21.

The back side white reference plate 44 further forms a guide surface on one side of a sheet path, together with front and rear guide plates 43 and 45 in the document conveyance direction, and is positioned closer to the second image reader 21 relative to the front and rear guide plates 43 and 45 to function as a document guide positioned at a back side image reading position P2 to move the conveyed original document along the second image reader 21.

This back side white reference plate 44 is coated by a known method to form a white reference face 44a, for example, on a substrate formed by bending a sheet metal punched out into a predetermined shape. The back side white reference plate 44 has an inclined wall 44f positioned on a front side to guide the document passing through the guide plate 43 on the upstream side of the document conveyance direction toward the second image reader 21, an upper wall 44t (in other words, a plate body) extending in the document width direction while forming the white reference face 44a, and a rear wall 44r integrally formed with the inclined wall 44f and the upper wall 44t to support the inclined wall 44f and the upper wall 44t.

Furthermore, the back side white reference plate 44 is moved in the main scanning direction (that is, an original document width direction orthogonal to the document conveyance direction) of the second image reader 21 that functions as a line image sensor, and performs dynamic shading correction as described below.

Here, a description is given of the shading correction.

In the shading correction, for uniform image reading in the first and second image readers 11 and 21, correction data are generated on the basis of output signals generated upon reading a front side white reference plate 42 and the back side white reference plate 44 by the line image sensors of the image readers 11 and 21, and the correction data are used to correct image data obtained from the output signal of the line image sensor upon reading the document.

The correction data can be obtained for example when a document does not arrive near the back side image reading position P2 before starting reading, or between a preceding document and a subsequent document (between sheets).

Correction data for reading a front image by the first image reader 11 is generated on the basis of an output signal generated upon reading the front side white reference plate 42 by the first image reader 11 moved immediately below the front side white reference plate 42 formed at a guide plate 41 adjacent to the DF contact glass 14.

In contrast, correction data for reading a rear image by the second image reader 21 is generated on the basis of an output signal generated upon reading the back side white reference plate 44 positioned opposite to the second image reader 21. The back side white reference plate 44 is configured as a guide plate on one side of a sheet passing guide, and unfortunately scratches caused by frictional contact with the document or adhesion of dust such as paper dust occurs thereon. When a condition of the back side white reference plate 44 is deteriorated due to the scratches or the like, read correction data is also deteriorated similarly to the back side white reference plate 44, and a read image may have abnormality such as streaks which the document does not have.

As a technology eliminating such deterioration in correction data, dynamic shading correction technology is provided, and the present embodiment employs this dynamic shading correction technology.

That is, in the present embodiment, when reading the correction data, the back side white reference plate 44 is moved in the main scanning direction (that is a document width direction) to generate correction data for a white reference face area excluding a portion having a deteriorated condition such as scratches on the back side white reference plate 44, or to generate correction data smoothed for the white reference face area including a predetermined range in the vicinity of the portion having a deteriorated condition, such as scratches, in addition to the portion having a deteriorated condition. It is to be noted that, since the front side white reference plate 42 is disposed on the back side of a sheet passing surface of the guide plate 41 adjacent to the DF contact glass, the front side white reference plate 42 is prevented from friction, and has no scratch.

More particularly, in the present embodiment, for example, the shading correction is performed before reading an image of the first document, and then, the shading correction (the intermittent shading correction) is performed again after a predetermined image reading time, during continuous operation In the shading correction, the white reference face 44a of the back side white reference plate 44 facing the second image reader 21 and extending in the main scanning direction is read by the second image reader 21. Then, on the basis of a read value, sensitivity in reading a rear image at each member of the second image reader 21 in the main scanning direction, an image forming condition in the image former, or the like is adjusted.

In the shading correction, Dust or the like on the white reference face 44a of the back side white reference plate 44 results into inappropriate correction, and an image has streaks or the like thereon.

Therefore, in the present embodiment, reading a plurality of data sets is performed while moving the back side white reference plate 44 in the main scanning direction during shading correction, and the shading correction is stably performed without influence of the dust or the like.

In the back side white reference plate 44, the white reference face 44a is positioned opposite to the second image reader 21, within a predetermined range in the document width direction orthogonal to the document conveyance direction.

Figure 3:
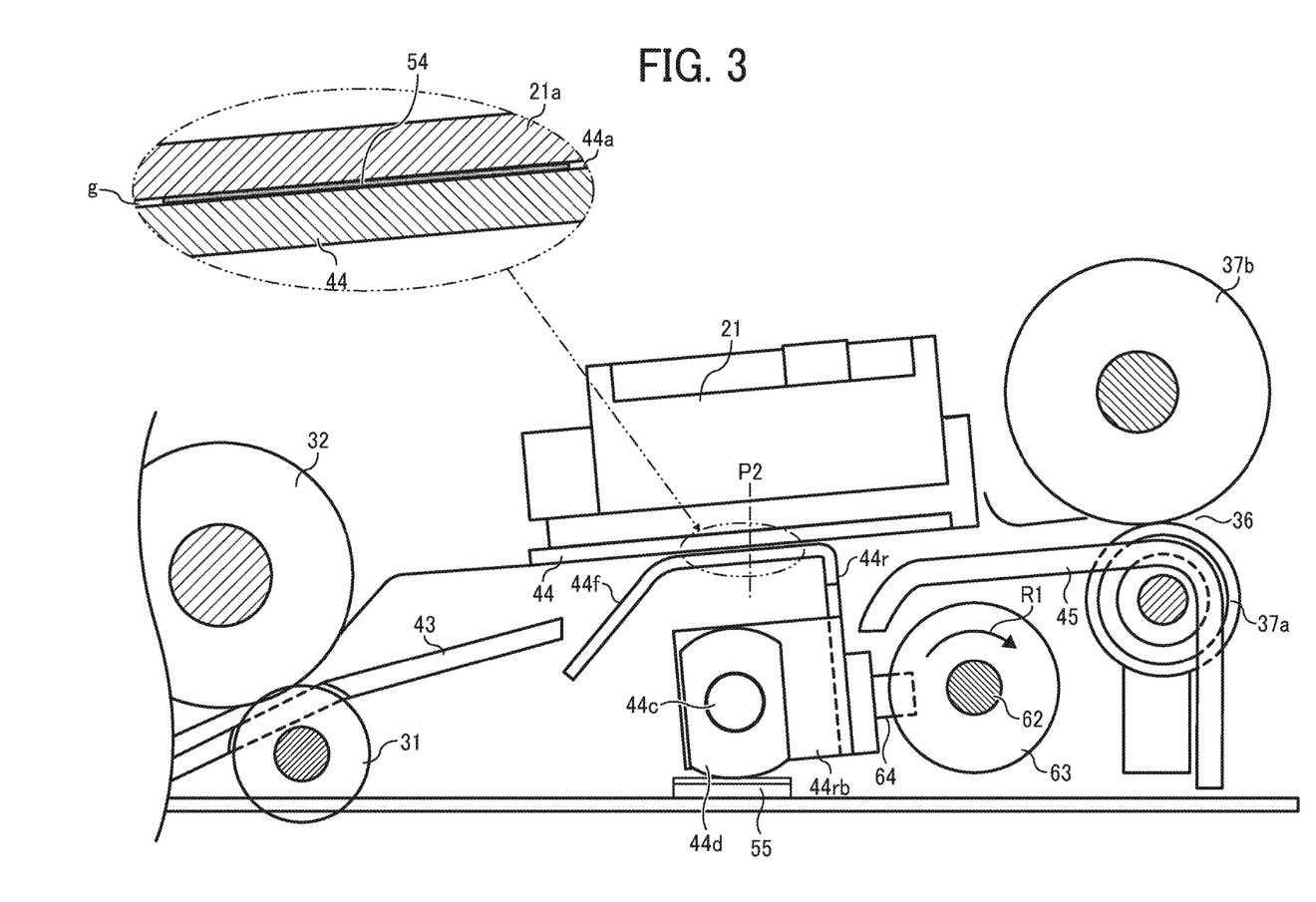
FIG. 3 is an enlarged cross-sectional view of a main portion illustrating a configuration of the periphery of a movable color reference body and a cylindrical cam serving as a driving device for the color reference body in the image reading device according to an embodiment of this disclosure.
Figure 4:
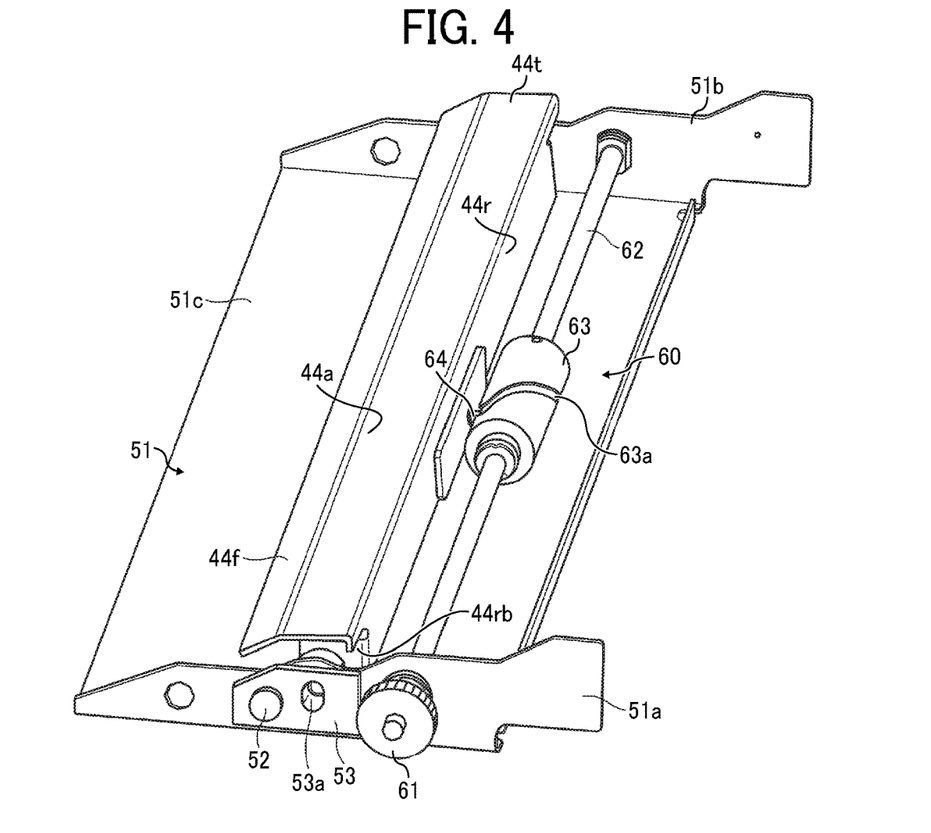
FIG. 4 is a perspective view of the color reference body, the cylindrical cam, and a frame supporting the color reference body and the cylindrical cam, in the image reading device according to an embodiment of this disclosure.
Figure 5:
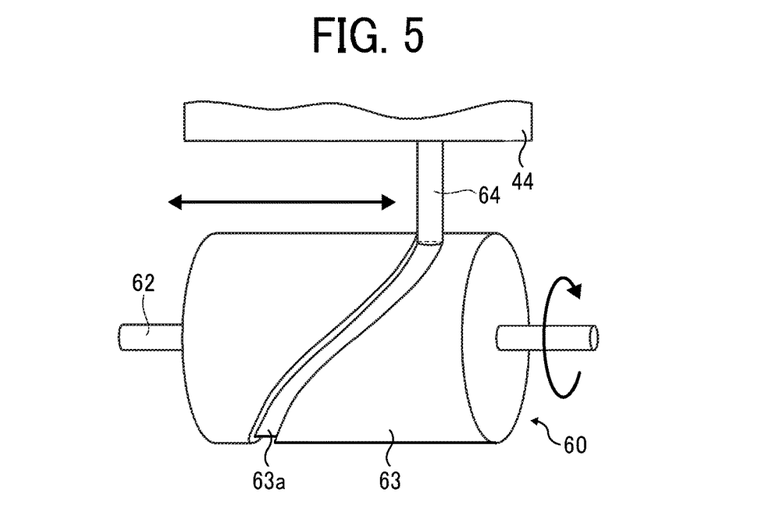
FIG. 5 is an explanatory operation diagram illustrating a driving method of the driving device using the cylindrical cam and a projection of the color reference body, in the image reading device according to an embodiment of this disclosure.

As illustrated in FIGS. 2 to 4, the back side white reference plate 44 is supported by a pair of parallel side panels 51a and 51b of a frame 51, on both outer sides of a sheet passing region W for the document sheet in the document width direction. A pair of bearing panels 53 each has a shaft hole 53a of an elongated hole-shaped cross-section, and each of the pair of bearing panels 53 is supported on each of the pair of side panels 51a and 51b, through a connection pin 52, to be turned in a vertical direction in FIGS. 2 and 4. In the shaft holes 53a of the pair of bearing panels 53, center shafts 44c are held in an upright attitude relative to panel surfaces of the pair of bearing panels 53. The center shafts 44c project from both-end bends 44rb of the rear wall 44r of the back side white reference plate 44 coaxially in the document width direction (on the same axis in the main scanning direction).

A pair of center shafts 44c is fitted to the pair of bearing panels 53 to be moved in a major axis direction of each shaft opening 53a, and in an axial direction of both center shafts 44c, and to be rotated axially. Each center shaft 44c has a circular cross-section of a diameter smaller than a minor axis of the shaft opening 53a to an extent for a sliding gap.

Furthermore, a pair of bearings 44d each has an elongated circular shape (oval shape), and is each integrally connected to a base end of the center shaft 44c. The bearings 44d are provided at the both-end bends 44rb of the back side white reference plate 44. A pair of leaf springs 55 (biasing bodies) is each interposed between the bearing 44d and a bottom panel 51c of the frame 51.

Each of the pair of leaf springs 55 extends from one end fixed to the bottom panel 51c of the frame 51, in a longitudinal direction (main scanning direction) of the back side white reference plate 44, and is separated from the bottom panel 51c of the frame 51, at the other end making contact with the bearing 44d. The leaf springs 55 each biases the back side white reference plate 44 so that the back side white reference plate 44 is pushed up toward the toward the second image reader 21 to control the direction of the back side white reference plate 44 to the second image reader 21.

The pair of leaf springs 55 serves as a pressing body pressing the back side white reference plate 44 to the second image reader 21, and the pair of the leaf springs 55 and the pair of bearings 44d at both ends of the back side white reference plate 44 are engaged with each other to be slid in the document width direction. It is to be noted that the bearing 44d making contact with each of the pair of leaf springs 55 has a lower outer peripheral surface having a constant curvature radius, and a support height of the center shaft 44c relative to an upper surface of the leaf springs 55 at the other end is constant, regardless of change in turning attitude of the back side white reference plate 44 about an axis of the center shaft 44c.

Between the second image reader 21 and the back side white reference plate 44, a pair of spacers 54 (reading gap forming device) is spaced apart outside the predetermined range in the document width direction as the sheet passing region W to have a sheet passing width allowing a document having a maximum document width to pass on the back side white reference plate 44.

The spacers 54 are stuck to both-end members 44e on an upper side of the back side white reference plate 44, adjacent to the white reference face 44a in the sheet passing region W, on one side, and form the reading gap g having a strip shape of a constant thickness, between the second image reader 21 and the back side white reference plate 44, so that passage of the original document and reading of the rear image are allowed, while receiving a biasing force from the leaf springs 55, outside the sheet passing region W.

Furthermore, the pair of spacers 54, respectively fixed to both-end members 44e on the upper side of the back side white reference plate 44, is slidably engaged with the back side DF contact glass 21a of the second image reader 21 to have a low frictional coefficient lower than a predetermined value, and the back side white reference plate 44 biased to the second image reader 21 by the leaf springs 55 is restricted in rotation about the axis of the center shaft 44c.

FIG. 4 is a perspective view of a main portion after the front and rear guide plates 43 and 45 in the document conveyance direction are removed from the back side white reference plate 44.

As illustrated in FIG. 4, in the present embodiment, in order to perform the dynamic shading correction, a driving device 60 is provided which can drive the back side white reference plate 44 to reciprocate in the main scanning direction relative to the second image reader 21.

The driving device 60 includes a driving motor, not illustrated, used also for conveyance drive, a driving gear 61, a rotation shaft 62, a cylindrical cam 63, and a fitting pin 64 projecting from the back side white reference plate 44 to the cylindrical cam 63.

The driving gear 61 is integrally fixed to one end of the rotation shaft 62 to input power from the driving motor to the rotation shaft 62, through a transmission gear, not illustrated.

The rotation shaft 62 is rotatably supported by the side panels 51a and 51b of the frame 51 to be parallel in the main scanning direction, and the cylindrical cam 63 as a force drive transmission body is integrally connected to an axial center of the rotation shaft 62.

The cylindrical cam 63 has a cam groove 63a in the outer periphery thereof, and a front end of the fitting pin 64 is slidably inserted into the cam groove 63a. The cam groove 63a of the cylindrical cam 63 is formed around the cylindrical cam 63 to windingly extend circumferentially and axially.

The fitting pin 64 is a columnar projection cantilevered by the rear wall 44r of the back side white reference plate 44 to project from a longitudinal center of the rear wall 44r of the back side white reference plate 44 to the cylindrical cam 63, and has a rigidity to move the back side white reference plate 44 in the main scanning direction of the second image reader 21, according to rotation of the cylindrical cam 63.

Accordingly, when the driving gear 61 is driven by the driving motor described above to rotate the rotation shaft 62 and the cylindrical cam 63, the back side white reference plate 44 supported by the pair of center shafts 44c at both ends to be movable relative to the side panels 51a and 51b of the frame 51 reciprocates in a thrust direction, in association with rotation of the driving gear 61. It is to be noted that a direction in which the back side white reference plate 44 is moved by the driving device 60 may be slightly displaced from the main scanning direction, but the direction is preferably in the main scanning direction, in view of attitude maintenance, movement guide, or the like.

Furthermore, the driving device 60 moves the back side white reference plate 44 relative to the second image reader 21, between a normal relative position being a position for rear image reading operation, and a relative position for shading correction, displaced from the normal relative position.

During rear image reading operation, the back side white reference plate 44 is stopped at a fixed position and is held in a fixed attitude. In contrast, during shading correction, the back side white reference plate 44 is moved to the relative position for shading correction to be displaced in the main scanning direction, from the normal relative position relative to the second image reader 21. The relative position for shading correction is not limited to the fixed position, and may be changeably set in the main scanning direction.

As described above, the driving device 60 has the cylindrical cam 63 engaged with the center of the back side white reference plate 44 in the document width direction, and drives the back side white reference plate 44 in the document width direction, at the center, through the cylindrical cam 63. However, a rotation direction of the cylindrical cam 63 for moving the back side white reference plate 44 from the normal relative position to the relative position for shading correction is a clockwise direction R1 (specific rotation direction) in FIG. 3 for biasing the back side white reference plate 44 to the second image reader 21.

Furthermore, at least one of the pair of spacers 54 and both-end members 44e (both ends) on the upper side of the back side white reference plate 44 positioned outside the sheet passing region W includes a conductive body made of a conductive material, and making contact with the second image reader 21. In addition, the conductive body, for example, the spacers 54 and both ends of the back side white reference plate 44 removes static electricity from a back side reading DF contact glass 21a forming a guide surface of the second image reader 21, and prevents charging the second image reader 21.

Next, a description is given of operations of the image reading device 5 of the digital malfunction printer 1 that functions as an image forming apparatus.

In the digital multifunction printer 1 according to the present embodiment, configured as described above, when original documents are set in the document mounting tray 24 in a state in which whether an image formed on the rear side of the original document is read is set, as the copy start button is pressed, the controller of the ADF 20 receiving a reading start instruction from the controller of the apparatus body 10 performs control in the DF scanner mode.

Then, when the first document does not arrive near the image reading position P1 or P2 before starting reading, the shading correction is performed. Then, the shading correction is intermittently performed, for example, between a preceding original document and a subsequent original document (between sheets) at every predetermined time.

By contrast, in shading correction in a back side reading system according to the present embodiment (hereinafter, referred to as a "back side shading correction"), sensor sensitivity adjustment for reducing uneven color during normal rear image reading time is performed, on the basis of a read value from the white reference face 44a by the second image reader 21.

However, in a comparative image reading device, a moving mechanism includes different complex parts. Moreover, when or after a white reference plate having a white reference face is moved from one of a position for reading a conveyed original document and a position for reading the white reference face to the other, the white reference plate tends to incline relative to the image reading unit.

That is, an original document reading gap is set between the white reference plate and the reading unit. Therefore, both ends of the white reference plate and both ends of the reading unit are supported by a frame extending in parallel in a document conveying direction outside a predetermined range in the document width direction of an original document. In addition, the white reference plate to relatively move the white reference plate and the reading unit is configured to slide along a guide of the frame. Accordingly, the white reference plate easily inclines or rattles in a document sliding direction and a document reading gap direction.

Accordingly, when the white reference plate inclines to the reading unit within the predetermined range of rattling, a deviation is generated in the reading gap formed between the reading unit and the white reference plate. Therefore, the deviation of the gap may generate deviation in the reading main and the deviation of a conveyance load. Accordingly, the deviation of a white reference causes image errors, and therefore it has been concerned that the deviation of the conveyance load generates skew.

In the shading correction, the back side white reference plate 44 is driven in the document width direction, at the longitudinal center, through the cylindrical cam 63 and the fitting pin 64 of the driving device 60. Accordingly, the back side white reference plate 44 biased to the back side reading DF contact glass 21a of the second image reader 21 while being supported at both ends to be slidable in the main scanning direction is prevented from being inclined upon receiving a driving force from the driving device 60, and deviation is effectively restrained which is generated in the reading gap "g" for image reading, due to inclination of the back side white reference plate 44.

Thus, deviation in main scanning for reading or deviation in conveyance load caused by deviation such as variation in reading gap "g" in the sheet passing region W, or an abnormal read image caused by deviation in white reference data is effectively prevented.

Furthermore, in the present embodiment, the force drive transmission body between the driving device 60 and the back side white reference plate 44 includes a cylindrical cam 63, the back side white reference plate 44 has the fitting pin 64, and thus, the driving device 60 is formed into a simple and compact configuration.

In addition, drive connection for transmitting rotation power, to the cylindrical cam 63, from a driving source such as the conveying rollers for document conveyance is facilitated, and thus, a moving mechanism for the back side white reference plate 44 is simplified in configuration to be installed inexpensively in a saved space.

Furthermore, in the shading correction, the driving device 60 rotates the cylindrical cam 63 in a specific rotation direction so that the fitting pin 64 engaged with the cylindrical cam 63 is biased to the second image reader 21, and thus, floating, from the guide surface, of the back side white reference plate 44 being conveyed to the relative position can be prevented, during the shading correction.

In addition, in the present embodiment, the pair of spacers 54 positioned outside the sheet passing region W is slidably engaged with at least one of the second image reader 21 and the back side white reference plate 44, while receiving the biasing force from the leaf springs 55. Accordingly, a sliding surface having a shape suitable for attitude maintenance for and movement of the back side white reference plate 44 is readily disposed to prevent abrasion of a slide and variation in the reading gap "g". In consequence, reduction of the reading gap g causing increase of a conveyance load on the document or generation of skew during conveyance can be prevented, and generation of abnormal noise caused by friction in the slide during movement of the back side white reference plate 44 can be also prevented.

Furthermore, in the present embodiment, at least one of the pair of spacers 54 and both ends of the back side white reference plate 44 includes the conductive body making contact with the second image reader 21, so that removal of static electricity is facilitated to prevent charging of the second image reader 21, and noise is prohibited during image reading by the second image reader 21.

Furthermore, in the present embodiment, both of the pair of leaf springs 55 extending in the document width direction being the main scanning direction, while being supported by the frame 51 are engaged with lower surfaces of the pair of bearings 44d at both ends of the back side white reference plate 44 to be slid in the document width direction. Thus, the abnormal noise is difficult to be generated by friction in the slide between the back side white reference plate 44 and the leaf springs 55.

In the digital multifunction printer 1 according to the present embodiment, the image reading operation having reduced deviation in the reading gap "g" can form an externally output image having high quality, on the basis of the read image with reduced uneven brightness or uneven color.

As described above, according to the present embodiment, the ADF 20 can be provided which has a simple configuration to effectively restrain inclination of the white reference face 44a of the back side white reference plate 44 relative to the reading unit when or after the back side white reference plate 44 is moved from one of the position for reading a conveyed document and the position for reading a white reference face, to the other thereof, and further the digital multifunction printer 1 can be provided.

It is to be noted that, in an embodiment described above, both of the pair of spacers 54 are stuck to both-end members 44e on the upper side of the back side white reference plate 44, but the spacers 54 are preferably engaged with at least one of the second image reader 21 and the back side white reference plate 44, while being restricted in movement range to prevent falling out thereof.

Furthermore, in an embodiment described above, the embodiment of this disclosure is applied to the image reading device 5 for a rear image, but, as a matter of course, this disclosure may be applied to a device performing conveyed document reading for a front image.

Furthermore, the force drive transmission body between the driving device 60 and the back side white reference plate 44 includes the cylindrical cam 63, but, as a matter of course, may include another force drive transmission body such as an end cam and a return spring or a worm and wheel.

Furthermore, in an embodiment described above, this disclosure is applied to the automatic document feeder in the image forming apparatus such as a digital multifunction printer 1, but the image reading device 5 according to the embodiment of this disclosure is preferably externally read and output read image data, and, as a matter of course, an output form of the read image is not particularly limited. Furthermore, the image forming apparatus 1 including the image reading device 5 according to the embodiment of this disclosure is not limited to an image forming apparatus outputting a record to a recording sheet such as transfer paper, and may be applied to an image forming apparatus forming a new two-dimensional or three-dimensional image on the basis of the read image.

To achieve an object described above, an image reading device 5 according to an embodiment of the disclosure includes an image reader to read an image of a conveyed document, a movable color reference body having a white reference face used for shading correction in the image reader to position the white reference face opposite to the image reader within a predetermined range in a document width direction orthogonal to a conveyance direction of the document, a biasing body to bias the color reference body to the image reader, a reading gap forming device interposed between the image reader and the color reference body to form a reading gap g for reading the image between the image reader and the color reference body, while receiving a biasing force from the biasing body, on the outside of the predetermined range, and a driving device 60 to drive the color reference body to move the color reference body in the document width direction, relative to the image reader, and the driving device 60 has a force drive transmission body engaged with a center of the color reference body in the document width direction, and drives the color reference body in the document width direction, at the center, through the force drive transmission body.

According to this configuration, inclination of a white reference plate upon receiving a driving force from the driving device 60 is prohibited, and deviation in the reading gap g for image reading caused by the inclination of the white reference plate is effectively restrained. Accordingly, deviation in main scanning for reading or deviation in conveyance load caused by the deviation in the reading gap g, or abnormal read image caused by deviation in white reference is effectively restrained.

In the image reading device 5 according to an embodiment of this disclosure, the force drive transmission body of the driving device 60 includes a cylindrical cam 63 rotating about the document width direction, and the color reference body may include a plate body extending in the document width direction, and a projection projecting from the plate body toward the cylindrical cam 63 to be engaged with the cylindrical cam 63.

According to such a configuration, drive connection for transmitting rotation power, to the cylindrical cam 63, from a driving source such as conveying rollers for document conveyance is facilitated, and a moving mechanism for the back side white reference plate can be installed inexpensively in a saved space.

The driving device 60 can rotate the cylindrical cam 63 in a specific rotation direction to bias the projection engaged with the cylindrical cam 63 to the image reader, and bias the color reference body to the image reader when driving the color reference body in the document width direction by rotation of the cylindrical cam 63. In this configuration, floating of the white reference plate is prohibited during movement.

The reading gap forming device has a pair of spacers 54 interposed between the image reader and the color reference body, on the outside of the predetermined range, and the pair of spacers 54 may be slidably engaged with at least one of the image reader and the color reference body.

In this configuration, the pair of spacers 54 forms the reading gap g between an image reader and a color reference body, while receiving a biasing force biasing the color reference body to the image reader, to readily dispose a sliding surface having a shape suitable for attitude maintenance for and movement of a color reference plate, and abrasion of a slide and variation in the reading gap g can be prevented. Accordingly, reduction of the reading gap g causing increase of a conveyance load on a document or generation of skew during conveyance can be prevented, and generation of abnormal noise in the slide during movement of the white reference plate can be also prevented.

In the image reading device 5 according to the embodiment of this disclosure, at least one of the pair of spacers 54 and both ends of the color reference plate positioned outside the predetermined range may include a conductive body making contact with the image reader. In this configuration, removal of static electricity is facilitated to restrain charging of the image reader.

In the image reading device 5 according to the embodiment of this disclosure, the biasing body includes a pressing body to press the color reference body to the image reader, and the pressing body and the color reference body may be engaged with each other to be slidable in the document width direction, in this configuration, generation of abnormal noise can be prevented in the slide between the white reference plate and the pressing body.

The image reading device 5 according to the embodiment of this disclosure may include a document conveying device to convey the document to a position where the image is read by the image reader.

Furthermore, the image forming apparatus may include the image reading device 5 having the configuration according to any of the embodiment of this disclosure described above, and an image former to form an externally output image on the basis of a read image read by the image reader of the image reading device 5.

In this configuration, image reading operation having reduced deviation in the reading gap g can form an externally output image having high quality, on the basis of the read image with reduced uneven brightness or uneven color.

As described above, the embodiment of this disclosure can provide an image reading device having a simple configuration to effectively prohibit inclination of the white reference plate relative to the reading unit when or after the white reference plate is moved from one of the position for reading a conveyed document and the position for reading a white reference face to the other thereof. The embodiment of this disclosure is useful for an image reading device which reads a document being conveyed to an image reading position, as a whole.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image reading device comprising:
    an image reader configured to read an image formed on a surface of an original document;
    a color reference body movable and having a white reference face used for shading correction in the image reader,
    the color reference body configured to position the white reference face at a position facing the image reader within a predetermined range in a document width direction orthogonal to a conveyance direction of the document;
    a biasing body configured to bias the color reference body to the image reader;
    a reading gap forming device interposed between the image reader and the color reference body and configured to form a reading gap for reading the image between the image reader and the color reference body, while receiving a biasing force from the biasing body, on the outside of the predetermined range; and
    a driving device configured to drive the color reference body to move the color reference body in the document width direction, relative to the image reader,
    the driving device having a force drive transmission body engaged with a center of the color reference body in the document width direction and driving the color reference body in the document width direction at the center via the force drive transmission body.

2. The image reading device according to claim 1,
    wherein the force drive transmission body of the driving device includes a cylindrical cam configured to rotate about a center axis extending in the document width direction, and
    wherein the color reference body includes a plate body extending in the document width direction, and a projection projecting from the plate body toward the cylindrical cam and being engaged with the cylindrical cam.

3. The image reading device according to claim 2,
    wherein the driving device rotates the cylindrical cam in a specific rotation direction such that the projection engaged with the cylindrical cam is biased toward the image reader, and
    wherein the color reference body is biased toward the image reader when driving the color reference body in the document width direction by rotation of the cylindrical cam.

4. The image reading device according to claim 2,
    wherein the reading gap forming device includes a pair of spacers interposed between the image reader and the color reference body, on the outside of the predetermined range, and
    wherein the pair of spacers is slidably engaged with at least one of the image reader and the color reference body.

5. The image reading device according to claim 4,
    wherein at least one of the pair of spacers and both ends of the color reference body positioned outside the predetermined range includes a conductive body configured to contact with the image reader.

6. The image reading device according to claim 1,
    wherein the biasing body includes a pressing body configured to press the color reference body to the image reader, and
    wherein the pressing body and the color reference body are engaged with each other to be slidable in the document width direction.

7. The image reading device according to claim 1, further comprising a document conveying device configured to convey the original document to a position at which the image reader reads the image.

8. An image forming apparatus comprising:
    the image reading device according to claim 1; and
    an image forming device configured to form an image read by the image reading device on a recording medium.

* * * * *